(12) United States Patent
Kneip

(10) Patent No.: US 8,482,846 B2
(45) Date of Patent: Jul. 9, 2013

(54) ADVANCED SHIFTING ALGORITHM FOR PROLONGING THE LIFE OF AN OPTICALLY NONLINEAR CRYSTAL

(75) Inventor: Axel Kneip, Kiel (DE)

(73) Assignee: Coherent GmbH, Goettingen (DE)

(*) Notice: Subject to any disclaimer, the term of this patent is extended or adjusted under 35 U.S.C. 154(b) by 415 days.

(21) Appl. No.: 12/852,894

(22) Filed: Aug. 9, 2010

(65) Prior Publication Data

US 2012/0033291 A1 Feb. 9, 2012

(51) Int. Cl.
*G02F 1/35* (2006.01)
(52) U.S. Cl.
USPC .......................................................... 359/326
(58) Field of Classification Search
USPC .......................................................... 359/326
See application file for complete search history.

(56) References Cited

U.S. PATENT DOCUMENTS

| 5,825,562 | A | 10/1998 | Lai et al. |
| 6,765,201 | B2 | 7/2004 | Uto et al. |
| 6,859,335 | B1 | 2/2005 | Lai et al. |
| 6,890,474 | B2 * | 5/2005 | Gruber et al. ................. 264/400 |
| 6,914,733 | B2 | 7/2005 | Dong et al. |

OTHER PUBLICATIONS

International Search Report and Written Opinion received for PCT Patent Application No. PCT/EP2011/003885, mailed on Oct. 13, 2011, 10 pages.

* cited by examiner

*Primary Examiner* — Kevin S Wood
(74) *Attorney, Agent, or Firm* — Morrison & Foerster LLP

(57) ABSTRACT

In a shifting algorithm for an optically nonlinear crystal arranged to frequency-convert beam of radiation, the location of one or more defects in the crystal is recorded as an exclusion zone. The location of the beam is stepped incrementally over a surface around a closed or open loop path in increments less than a beam dimension. The path is arranged such that the beam does not enter the exclusion zone.

11 Claims, 2 Drawing Sheets

ADVANCED SHIFTING ALGORITHM FOR PROLONGING THE LIFE OF AN OPTICALLY NONLINEAR CRYSTAL

TECHNICAL FIELD OF THE INVENTION

The present invention relates in general to generation of ultraviolet (UV) radiation in by frequency conversion of a laser beam in an optically nonlinear crystal. The invention relates in particular to methods of intermittently moving the crystal with respect to the beam to prolong the useful life of the crystal.

DISCUSSION OF BACKGROUND ART

Harmonic generation from fundamental-wavelength radiation is extensively used for generating radiation having wavelengths in the UV region of the electromagnetic spectrum. By way of example, from fundamental radiation having a wavelength of 1064 nanometers (nm), second harmonic (2H) radiation having a wavelength of 532 nm (green) can be generated by frequency-doubling the fundamental-wavelength radiation in a first optically nonlinear crystal. The 2H-radiation can then be sum-frequency mixed the with unconverted fundamental-wavelength radiation in a second optically nonlinear crystal to provide third-harmonic (3H) radiation having a wavelength of about 355 nm, i.e., a wavelength in the UV region.

The 2H-radiation can also be frequency-doubled in an optically nonlinear crystal to provide fourth-harmonic (4H) radiation having a wavelength of 266 nm. More complex frequency conversion schemes using two sources of fundamental radiation and a combination of harmonic generation and sum-frequency-mixing steps to provide specific wavelengths less than 200 nm. The shortness of the ultimately generated wavelength is limited primarily by the UV-transparency of available optically nonlinear crystals.

Almost from the day such frequency-conversion schemes for UV generation were first deployed it was found that an exit surface of any crystal used to convert one or more visible or infrared wavelengths of radiation to UV radiation would progressively deteriorate in the area where the UV radiation exited the crystal. If UV radiation at one wavelength were converted to UV radiation at a shorter wavelength, both entrance and exit surfaces would deteriorate.

The deterioration has been attributed to condensation of solid contaminants on the crystal resulting from UV breakdown of gaseous contaminants in an atmosphere surrounding the crystal. This has led to proposals for locating crystal in an enclosure in which a vacuum is maintained or which is purged and backfilled with an inert gas. Such enclosures, however, typically cost significantly more than the crystals they are trying to protect, whatever the measure of success.

Many suppliers of frequency-converted UV lasers, since such lasers were first widely commercially available, have simply accepted the deterioration as inevitable. These suppliers provided various means such that when a crystal surface deteriorated in one spot to a point where laser performance was compromised, the crystal could be moved manually or automatically with respect to the beam of radiation being converted such that a fresh surface of the crystal was exposed to the beam. This is often referred to by practitioners of the art as "crystal-shifting", and has provided an extended useful lifetime of the crystals, typically greater than two-thousand hours of operation.

In May of 2005, U.S. Pat. No. 6,890,474 entitled "Algorithm for Enhancing the Lifetime of Critical Components in a Laser System" was granted to Gruber et al. The critical components referred to are optically nonlinear crystals. This patent discloses dividing a surface of an optically nonlinear crystal into a matrix or grid (plural rows and plural columns) of contiguous rectangular areas which are described as "macro-spots" and have an area greater than the cross-section area of a beam being frequency-converted. The beam cross-section is described as a "micro-spot". The crystal is moved with respect to the beam such that, within a macro-spot, the micro-spot is shifted around some arbitrary path in increments, which can be more or less than a beam-cross section, until the macro-spot has degraded to point where performance will be compromised. The crystal is then moved such that the beam falls in a different macro-spot and the micro-spot is shifted in that macro-spot until a deterioration condition is or will be reached.

It is taught that the selection of a next macro-spot after a previous one is used, can be according to some predetermined pattern such as an outward spiral, or can be arbitrarily selected. It is admitted, however, that certain macro-spots, i.e. grid or matrix elements, would be designated as not usable if such elements included crystal defects such as inclusions, striations, or some other artifact of growth, cutting or polishing a crystal. Perfect crystals are an exception rather than the rule. Nevertheless, a lifetime of 19,000 hours is claimed to have been reached for one experimental example.

It is not clear how the 19,000-hour lifetime achieved by Gruber et al. compares with lifetimes achieved by others using other crystal-shifting schemes. Comparison is difficult in any event, as lifetime is dependent on factors such as crystal material, UV-beam intensity, converted wavelength, and atmospheric-conditions, among others.

However, it is arguable that for any given set of circumstances, the method of Gruber et al. would have used less than all the useful area of a crystal surface at a time when a crystal would be designated as having reached its useful lifetime. A root-cause of this is the obligatory division of the crystal into the regular grid of rectangular macro-spots.

Laser beams do not normally have a rectangular cross-section. The cross-section is usually circular or slightly elliptical. Accordingly, it is not possible even with overlapping of a beam in a shifting pattern to cover all of a rectangular area while still maintaining the beam within the area as taught by Gruber et al. Some area will be left unused, for that reason alone. This could of course be mitigated somewhat by defining macro-spots that had a much larger area than a micro-spot. This, however, would exacerbate another area-wasting aspect of the regular grid, namely, avoiding crystal defects, which can not normally be expected to conveniently confine themselves to one particular grid-element or macro-spot.

One example of this is depicted in FIG. 1A. Here, an area of crystal surface is depicted as having a clear aperture divided into a regular grid of six rows (A-F) and six columns (1-6). It is assumed here that the clear aperture practically will not extend all of the way to the edges of the surface. An inclusion (defect) 10 is located on a common boundary of grid elements (macro-spots) B3 and C3. According to the scheme of Gruber et al. these two elements (cross-hatched in FIG. 1A) out of thirty-six would be made unavailable for scanning (shifting) a micro-spot because of a defect having an area less than the area of one element.

It is not unusual, however, to have more than one defect in a crystal. FIG. 1B depicts the grid of FIG. 1A but wherein an inclusion 12 causes elements B2, B3, C2, and C3 to made unavailable for use, and a scratch 14 causes elements D4, E4, and E5 to made unavailable for use. Here again the unavailable elements are cross-hatched. This means only about 80% of the area of the crystal would be used, less any percentage resulting from an inability to use all of the area of any otherwise-usable macro-spot because of a non-rectangular beam cross-section. There is a need for a crystal-shifting method that does not have the area-wasting deficiencies of the method of Gruber et al.

SUMMARY OF THE INVENTION

The present invention is directed to a method of prolonging the lifetime of a surface of optically nonlinear crystal arranged to convert one or more beams of radiation into a beam of ultraviolet radiation. The ultraviolet radiation beam has a beam cross-section and the crystal surface includes one or more defects and has a clear aperture. The beam has an anticipated degradation time when the beam is operated continuously in any one position.

In one aspect the method of the present invention comprises defining one or more exclusion zones about the one or more defects of the crystal defects. The crystal is incrementally moved with respect to the beam at intervals less than the anticipated degradation time and in a manner such that the beam follows a path over the crystal surface within the clear aperture while avoiding the one of more exclusion zones.

In a preferred embodiment of the invention the movement increments are less than a beam dimension such that the beam path is an uninterrupted path. The uninterrupted path is a closed loop path which partially overlaps itself to avoid exclusion zones.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
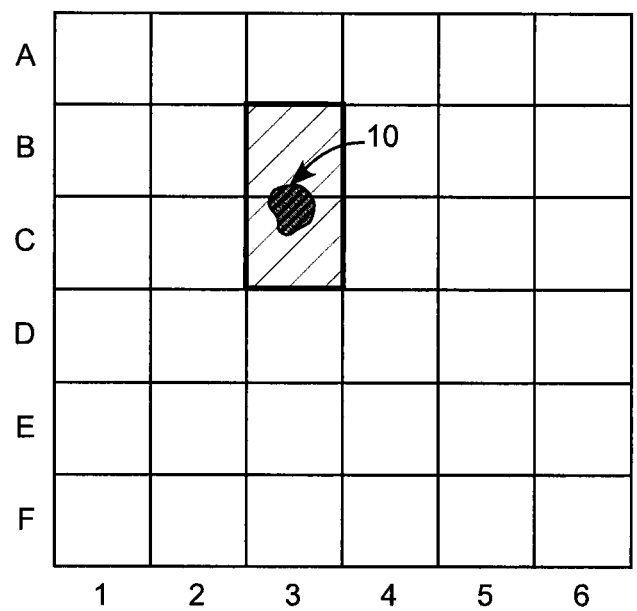
FIG. 1A and FIG. 1B schematically illustrate location of crystal defects and corresponding exclusion zones within a six-by-six rectangular grid in a prior-art crystal-shifting method.
Figure 1B:
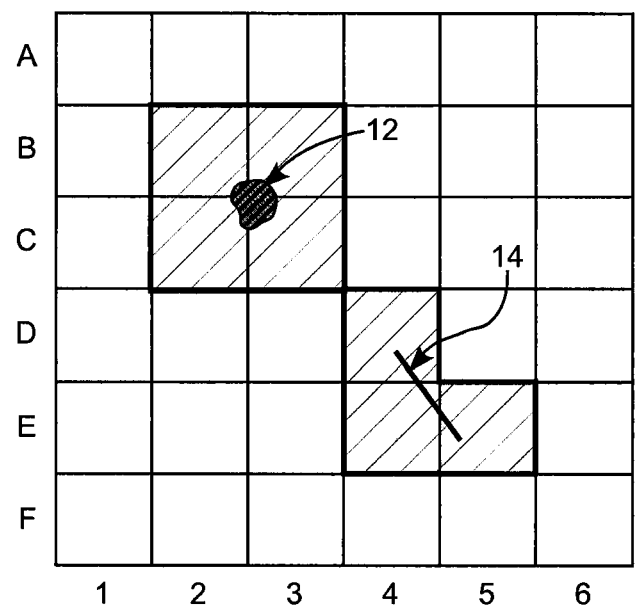
Figure 2:
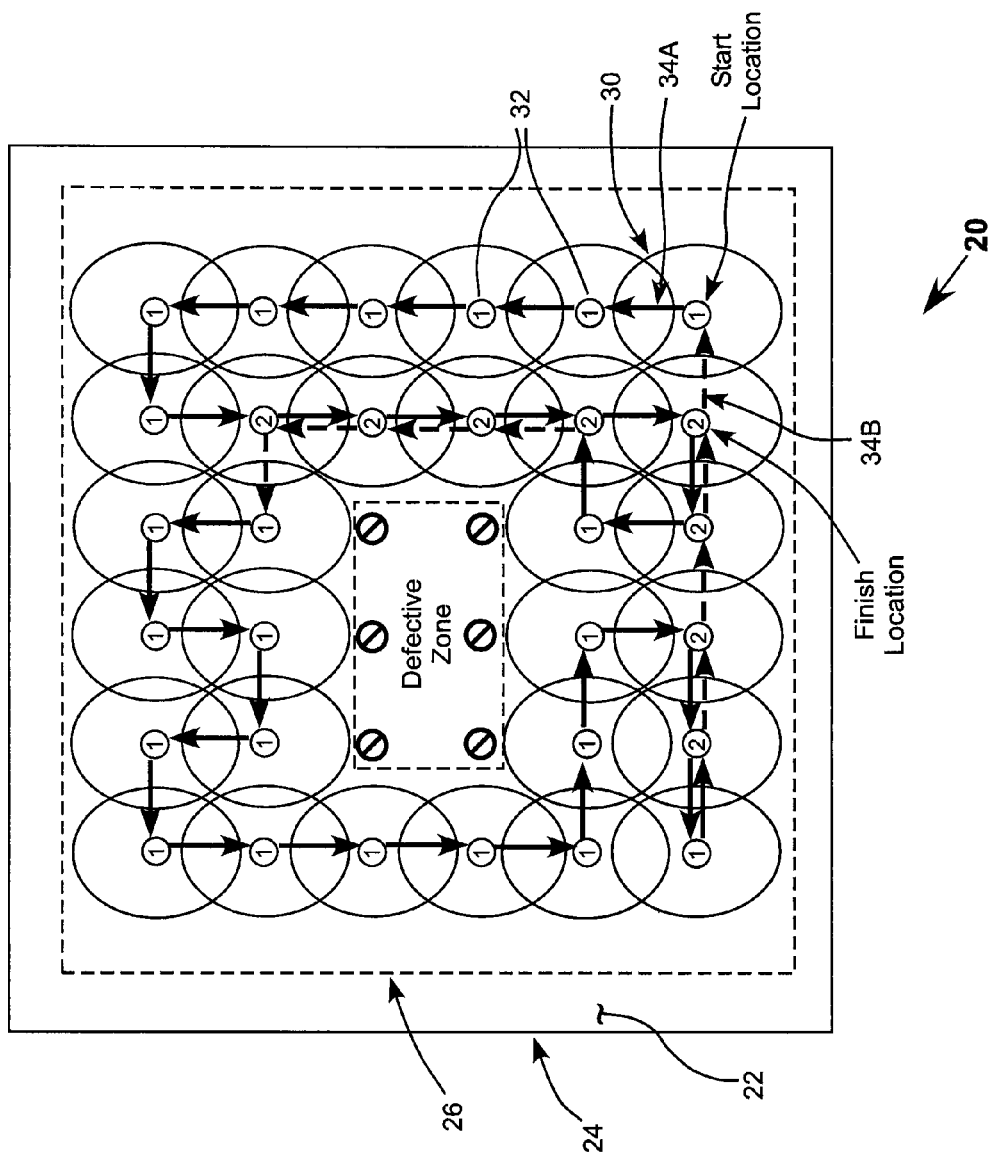
FIG. 2 schematically illustrates a preferred embodiment of a crystal-shifting method in accordance with the present invention, wherein a crystal is assigned a regular array of beam positions spaced apart by less than a beam diameter and crystal shifting causes a beam to be shifted from one position to adjacent position in a meandering pattern around a defect zone dwelling for a predetermined time in each location, while avoiding any positions within the defect zone, with some locations being visited twice in one completion of the pattern, and with the dwell-time in twice-visited locations being only one-half the dwell time in once-visited locations.

Continuing with reference to the drawings wherein like features are designated by like reference numerals, FIG. 2 schematically illustrates a preferred embodiment 20 of a crystal-shifting method in accordance with the present invention. Here a clear-aperture 26 on surface 22 of a crystal 24 is assigned a regular array of possible beam locations 32. The beam locations are spaced apart by less than a beam dimension so that beams in adjacent locations overlap. The locations are depicted here as small circles rather than points, which they are in practice, for convenience of description. Beam cross-sections at the locations are illustrated by ellipses, but that should not be considered limiting.

A degradation time is established experimentally. The degradation time is the time it would take for significant crystal damage to occur if a beam location were irradiated continuously. The term continuously as used here recognizes that frequency converted lasers typically deliver radiation in repeated pulses, so for purposes of description and the appended claims the term should be interpreted as continuously delivering the repeated pulses without excluding the possibility of delivering continuous-wave (CW) radiation.

The crystal is checked to determine if there any defective zones. Only one defective zone is depicted in FIG. 2, for convenience of illustration. After a defective zone is identified, possible beam locations lying within the zone are designated by a status "bad", i.e., not possible locations in this particular crystal. All other locations are designated "good".

It is emphasized here that the array of beam locations is by no means equivalent to the matrix or grid of "macro-spots" in the above described Gruber et al. patent. In this embodiment of the crystal-shifting method of the present invention, a continuous path of overlapping beam areas can be selected anywhere within the designated clear aperture outside exclusion zones around crystal defects.

Given a starting location for beam 30, here, in the bottom right-hand corner of the array, the crystal is shifted in a meandering pattern, albeit regular (all direction changes in integer multiples of 90°), from the starting location to an adjacent location, and from that location to another adjacent location, and so on, until each location designated "good" has been visited at least once, with some locations being visited twice in completing the pattern once. The beam dwells in each location for a predetermined time less than the degradation time. The dwell time in locations visited once is the same. The dwell-time for locations visited twice is one-half of the dwell time for locations visited once.

Once the path has been selected by a user, the locations are assigned an attribute for the "dwell-time per visit" of each thereof. This dwell time is less than the established degradation time. In FIG. 2, locations visited once are assigned an attribute "1", and locations visited twice are assigned an attribute "2". The attributes determine the above-discussed dwell-times. A beam can be shifted out of any location once or twice in one completion of a selected pattern. A shift direction or directions are assigned to each "good" location once the path has been selected.

In the exemplary crystal-shifting pattern of FIG. 2 one completion of the pattern is designated by a plurality of arrows 34A and 34B. In a twice-visited location the beam will be shifted out of that location (to an adjacent location) twice, each time in a different direction. The first shift-direction is indicated by a bold solid arrow (34A). The second shift-direction is indicated by a bold dashed arrow (34B).

The pattern can be traced only once from the start location to the finishing location so the path is in effect an open loop path. Alternatively, once the pattern has been completed from the starting location to a finishing location adjacent the starting location, the crystal-shifting pattern can be repeated (now in effect going several times around a closed loop path) until crystal degradation is detected or anticipated from the established degradation time.

Those skilled in the art will recognize without further illustration or detailed description that it is also possible, having reached the finish location a first time, to reverse the shifting direction and follow the open loop path reciprocally one or a plurality of times. Those skilled in the art will also recognize that while invention is described above as avoiding one designated exclusion zone, the inventive shifting method is equally applicable to avoiding more than one designated exclusion zone.

It should be noted that the location separations in FIG. 2 are depicted as being about one-half of a bean dimension. This is merely for convenience of illustration. In practice, smaller separations may be preferable. Suitable increments and dwell times per visit can be readily determined by experiment.

The present invention is described above in terms of a preferred embodiment. The invention, however, is not limited to the embodiment described and depicted herein. Rather the invention is limited only by the claims appended hereto.

What is claimed is:

1. A method of prolonging the lifetime of a surface of a transmissive optical element from degradation caused by a radiation beam, the crystal surface including at least one defect and having a clear aperture and an anticipated degradation time when the beam is operated continuously in any one position, the method comprising:
    defining an exclusion zone about the defect of the crystal based on the location of the defect in a manner to limit the area of the defect free region encompassed within the exclusion zone; and
    incrementally moving the crystal with respect to the beam at intervals less than the anticipated degradation time and in a manner such that the beam follows a path over the crystal surface within the clear aperture while avoiding the exclusion zone and wherein distance of the incremental movements is less than the diameter of the beam.

2. The method of claim 1, wherein the movement increments are selected such that the path of the beam is an open-loop path and the beam goes from one end of the path to the other and back again a plurality of times.

3. The method of claim 1, wherein the movement increments are selected such that the path of the beam is a closed-loop path and the beam follows the path around the closed loop a plurality of times.

4. The method of claim 3, wherein in avoiding the exclusion zone the path is caused to overlap itself in a portion thereof.

5. The method of claim 4, wherein the dwell time at locations where the path overlaps is adjusted so that the sum of the dwell times created by the overlap of the path is substantially equal to the dwell time at locations where there is no overlap.

6. The method of claim 1, wherein the optical element is a nonlinear crystal and wherein the wavelength of the beam exiting the crystal is in the ultraviolet spectrum.

7. A method of prolonging the lifetime of a surface of a transmissive optical element from degradation caused by a radiation beam, the crystal surface including at least one defect and having a clear aperture and an anticipated degradation time when the beam is operated continuously in any one position, the method comprising:
    defining an exclusion zone about the defect of the crystal based on the location of the defect in a manner to limit the area of the defect free region encompassed within the exclusion zone; and
    incrementally moving the crystal with respect to the beam at intervals less than the anticipated degradation time in movement increments less than a dimension of the beam cross-section and in a manner such that the beam follows a closed-loop path over the crystal surface within the clear aperture while avoiding the exclusion zone and wherein distance of the incremental movements is less than the diameter of the beam.

8. The method of claim 7, wherein the beam follows the closed loop path a plurality of times.

9. The method of claim 8, wherein in avoiding the exclusion zone the path is caused to overlap itself in a portion thereof.

10. The method of claim 9, wherein the dwell time at locations where the path overlaps is adjusted so that the sum of the dwell times created by the overlap of the path is substantially equal to the dwell time at locations where there is no overlap.

11. The method of claim 7, wherein the optical element is a nonlinear crystal and wherein the wavelength of the beam exiting the crystal is in the ultraviolet spectrum.

* * * * *